(12) United States Patent
Dou et al.

(10) Patent No.: US 8,566,073 B2
(45) Date of Patent: Oct. 22, 2013

(54) SIMULATION DEVICE AND SIMULATION METHOD

(75) Inventors: Liang Dou, Beijing (CN); Zhenning Tao, Beijing (CN); Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/896,428

(22) Filed: Oct. 1, 2010

(65) Prior Publication Data

US 2011/0166846 A1 Jul. 7, 2011

Related U.S. Application Data

(63) Continuation of application No. PCT/CN2009/073272, filed on Aug. 14, 2009.

(51) Int. Cl.
*G06F 17/50* (2006.01)
*G06G 7/62* (2006.01)

(52) U.S. Cl.
USPC .................................................. 703/13

(58) Field of Classification Search
USPC ................... 703/13; 398/65, 85, 118
See application file for complete search history.

(56) References Cited

U.S. PATENT DOCUMENTS 6,623,187 B1 * 9/2003 Mihota ..................... 398/118

FOREIGN PATENT DOCUMENTS

JP 2010-154162 7/2010

OTHER PUBLICATIONS

Duthel et al., Impact of Polarisation Dependent Loss on Coherent POLMUX-NRZ-DQPSK, 2008, IEEE, pp. 1-3.*
Vassilieva et al., Impact of Polarization Dependent Loss and Cross-Phase Modulation on Polarization Multiplexed DQPSK Signals, 2008, IEEE, pp. 1-3.*
Manor et al., Performance of an optical wireless communication system as a function of wavelength, 2003, Optical Society of America, pp. 4285-4294.*
Roudas et al., Optimal Polarization Demultiplexing for Coherent Optical Communications Systems, IEEE, vol. 28, No. 7, Apr. 1, 2010, pp. 1121-1134.*
Antoniades, N. et al., "Performance Engineering and Topological Design of Metro WDM Optical Networks Using Computer Simulation," IEEE Journal of Selected Areas in Communication, Jan. 2002, vol. 20, No. 1 pp. 149-165.
Duthel T., et al., Impact of Polarization Dependent Loss on Coherent POLMUX-NRZ-DQPSK, Optical Communication Conference and Exposition and the National Fiber Optic Engineers Communication Conference [CD-ROM], Optical Society of America, Feb. 2008, OThU5, pp. 1-3.
Japanese Office Action mailed Aug. 6, 2013 in corresponding Japanese Application No. 2012-524077.

* cited by examiner

*Primary Examiner* — Omar Fernandez Rivas
*Assistant Examiner* — Bernard E Cothran
(74) *Attorney, Agent, or Firm* — Staas & Halsey LLP

(57) ABSTRACT

A simulation method for a cascade communication system comprising a nodes sequence numbered as 1 to N from a transmitter to a receiver, comprises: acquiring simulation parameters; calculating reverse transfer functions of the nodes; determining a current node in the sequence; adding noise that should be added at the current node to a simulation signal of a previous node; simulating the current node to generate a simulation signal of the current node, by using the simulation signal of the previous node added with the noise that should be added at the current node, based on the reverse transfer function of the current node; judging whether simulations of all the nodes are completed; if yes, repeating the adding and the simulating; if not, determining a cost of the based on the simulation signal of the current node.

15 Claims, 4 Drawing Sheets

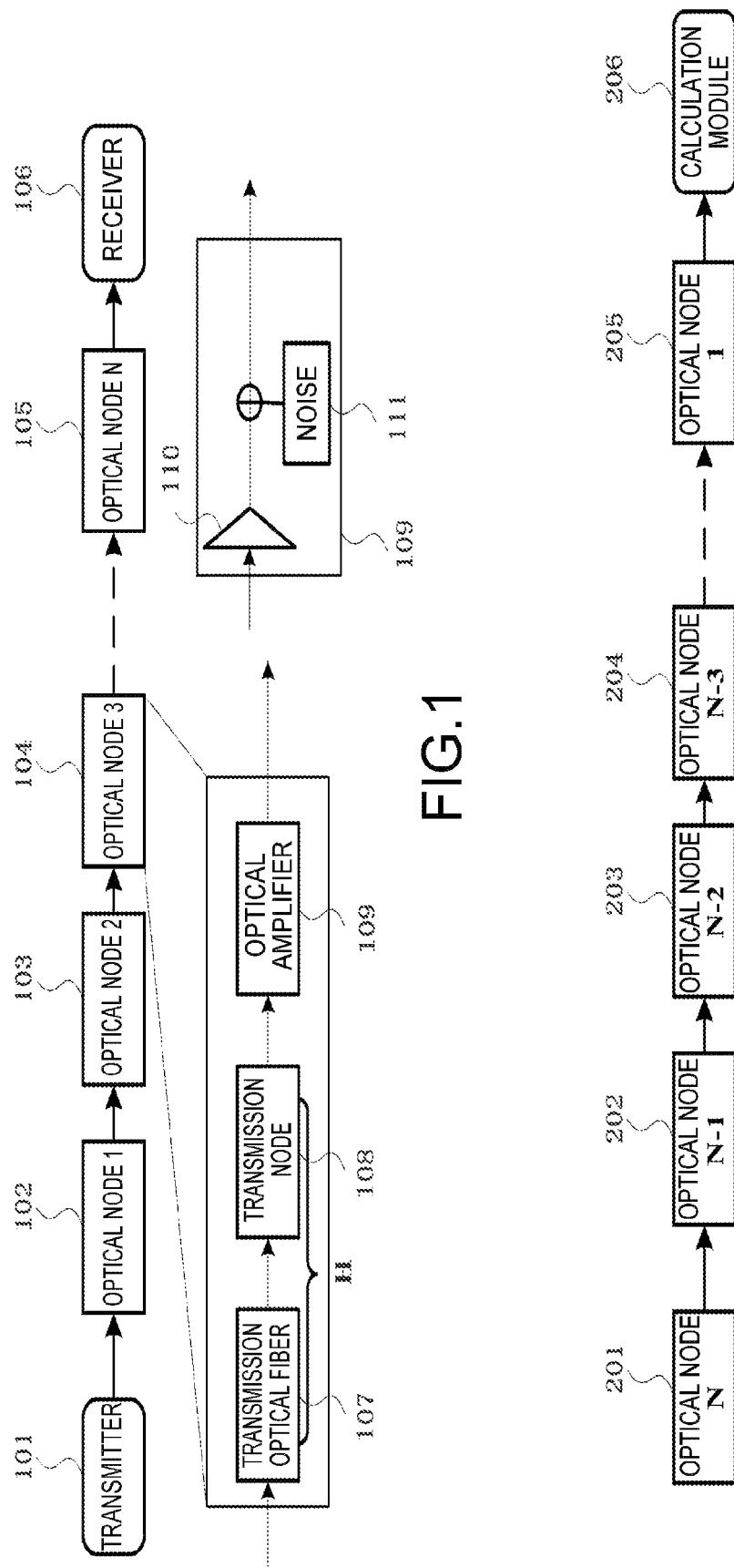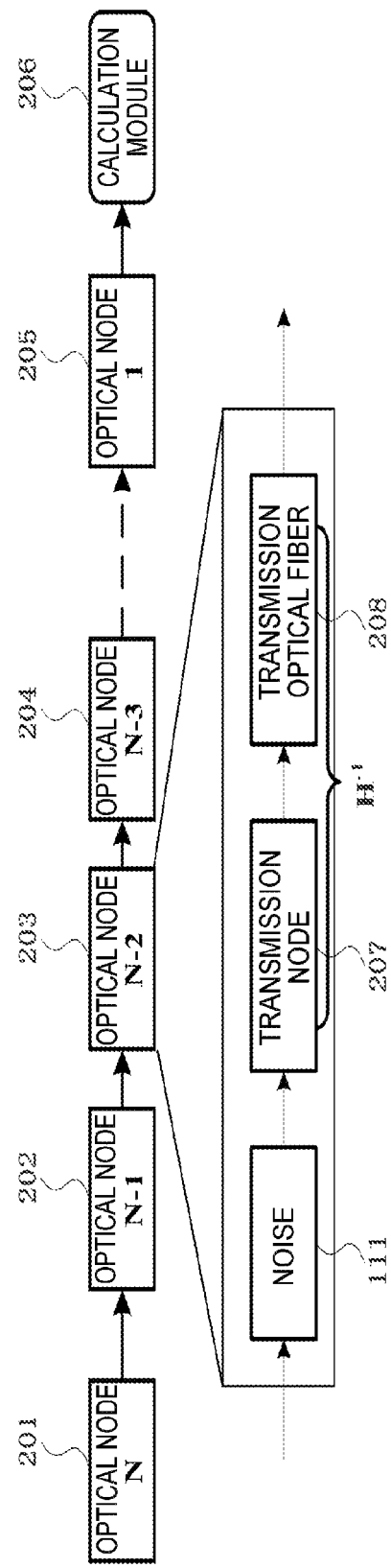
FIG.1
FIG.2

SIMULATION DEVICE AND SIMULATION METHOD

CROSS REFERENCE TO RELATED APPLICATIONS

This application is a continuation of International Application No. PCT/CN2009/073272, filed Aug. 14, 2009, the disclosure of which is incorporated herein by reference.

FIELD OF THE INVENTION

The present invention relates to a communication system simulation. The present invention relates to a simulation device and simulation method for simulating a cascade communication system.

DESCRIPTION OF THE RELATED ART

With the requirement of capacity and flexibility of the optical communication system is gradually improved, the coherent optical communication technique becomes more and more important. By means of two optical orthogonal polarization states (h, v), the polarization multiplexing system is capable of transmitting two independent signals simultaneously in the same bandwidth, so as to double the spectrum efficiency. The polarization multiplexing coherent communication system is widely deemed as the mainstream technique for the next generation of optical communication system.

In the conventional optical fiber link, any system cost or system penalty (e.g., increased bit error rate, decreased Q value, etc.) caused by dispersion or polarization effect can be eliminated or reduced through various equalization algorithms based on high speed digital signal processing technique at the receiving terminal. In order to evaluate damages in the optical fiber link and influences of various equalization algorithms on the system, the computer simulation is usually used to simulate the entire system.

FIG. 1 schematically illustrates a principle diagram of a conventional simulation method for cascade communication system. As shown in FIG. 1, with respect to the optical communication system having N (N≥1) number of cascaded nodes, the conventional simulation method firstly simulates a transmitter 101, i.e., generates a signal sequence of a certain length and simulates various processing by the transmitter. Next, the conventional simulation method simulates an actual transmission link, i.e., orderly simulates the optical nodes 1 to N (102~105) in the optical communication system. Each optical node is simulated to include a transmission optical fiber 107, a transmission node 108 and an optical amplifier 109 in series, wherein the transmission node 108 comprises a dispersion compensation module and a filter, while the optical amplifier can be represented by an ideal power amplifier 110 and a noise adder 111. The transmission characteristics of the transmission optical fiber 107 and the transmission node 108 can be combined to be represented by a transfer function H, comprising various mechanisms that damage the system performance. Finally, the conventional simulation method simulates a receiver 106, firstly simulates a front portion of the receiver, next simulates an equalizer, then simulates phase recovery, frequency difference control, etc., and finally calculates the bit error rate by counting the bit errors, or estimates a signal noise ratio (SNR) by using the statistic characteristics of the noise. The simulated receiver 106 can be a typical digital optical coherent communication receiver, and its internal structure is described by E. Ip et al. in "Coherent detection in optical fiber systems" Optics Express Vol. 16, No. 2, pp. 753-791, January 2008.

During the process of studying the present invention, the inventor finds the simulation method in the prior art has the following shortages.

Firstly, in order to calculate the bit error rate or estimate the SNR, the simulation method needs to generate a long signal sequence. In addition, when any of the optical nodes is simulated, the long signal sequence shall be processed. Thus the process load is increased and the simulation time is extended.

When the system cost caused by polarization effect is considered, the above problem is especially severe. The polarization effect includes the polarization mode dispersion (PMD) and polarization dependent loss (PDL). Since the optical polarization state continuously and randomly varies during the transmission in the optical fiber, usually a performance cost under a specific truncation probability is adopted to represent the system performance deterioration caused by the two polarization effects. In an actual system, typical values of the required truncation probability are 4.5e-4 and 5.7e-5, thus the required simulation times shall be larger than 1e6, and the low time efficiency of the conventional simulation method will be further amplified.

In order to improve the simulation efficiency, the current improvements usually make approximations to the link. In "Impact of polarisation dependent loss on coherent POL-MUX-NRZ-DQPSK" in Proc. Optical Fiber Communication Conference and National Fiber Optic Engineers Conference (OFC/NFOEC), San Diego, Calif., 2008, Paper OThU5, T. Duthel et al. provide a method for equalizing all nodes in a link into one node; while in "Impact of polarization dependent loss and cross-phase modulation on polarization multiplexed DQPSK signals", in Proc. Optical Fiber Communication Conference and National Fiber Optic Engineers Conference (OFC/NFOEC), San Diego, Calif., 2008, Paper OThU6, O. Vassilieva et al. provide a method that omits the random polarization rotation effect in each optical node, so as to simplify a complex statistical problem into a system cost that calculates determinacy of polarization effect.

The inventors find that although these methods can improve the simulation speed, they introduce some approximate conditions, and the results are not accurate. In addition, these improved methods also need to generate a long signal sequence, which shall be processed when each optical node is simulated, thus the improvement on the time efficiency is limited.

SUMMARY OF THE INVENTION

In view of the above limitations and shortages of the prior art, embodiments of the present invention are provided to eliminate or relieve one or more problems of the prior art, and at least provide a beneficial selection.

In order to achieve the above object, the embodiments of the present invention provide the following aspects.

Aspect 1, a simulation device for simulating a cascade communication system that includes a plurality of nodes numbered as 1 to N successively from a transmitter to a receiver, and N is greater than or equal to 1, wherein, the device comprises a simulation parameter acquisition unit, a reverse transfer function acquisition unit, a current node determination unit, a noise addition unit, a current node simulation unit, a control unit, and a cost determination unit, the simulation parameter acquisition unit acquires simulation parameters required for simulating the cascade communication system; the reverse transfer function acquisition unit calculates reverse transfer functions of the respective nodes based on the simulation parameters; the current node determination unit determines a current node in a sequence from the Nth node to the first node; the noise addition unit adds noise that should be added at the current node to a simulation signal of a previous node from the current node; the current node simulation unit simulates the current node to generate a simulation signal of the current node, by using the simulation signal of the previous node added with the noise that should be added at the current node, based on the reverse transfer function of the current node; the control unit judges whether simulations of all the nodes are completed, and controls to make the simulation signal of the current node simulation unit be output to the noise addition unit if the simulations of all the nodes are not completed, or controls to make the simulation signal of the current node be output to the cost determination unit if the simulations of all the nodes are completed; and the cost determination unit determines the cost of the cascade communication system based on the simulation signal from the current node simulation unit.

Aspect 2, the simulation device according to aspect 1, wherein, the noise addition unit adds noise indicated by power or vector, and the current node simulation unit simulates the current node by multiplying the simulation signal of the previous node added with the noise that should be added at the current node with the reverse transfer function of the current node.

Aspect 3, the simulation device according to aspect 1, wherein, the simulation device further includes a noise generation device for generating noise in a form of random number time series, the noise addition unit adds the noise in the form of random number time series to the simulation signal of the previous node, the current node simulation unit comprises a filter coefficient adjustment unit and a filter, the filter coefficient adjustment unit determines a filter coefficient to be used by the filter based on the reverse transfer function of the current node, and the filter filters the simulation signal of the previous node added with the noise that should be added at the current node, based on the filter coefficient determined by the filter coefficient adjustment unit.

Aspect 4, the simulation device according to aspect 3, wherein, the cost determination unit determines the cost of the cascade communication system by determining the power of the simulation signal from the current node simulation unit.

Aspect 5, the simulation device according to aspect 1, wherein, the simulation device simulates a system cost caused by PDL of the cascade communication system, and the reverse transfer function acquisition unit calculates reverse transfer functions of the respective nodes by determining gain factors of the respective nodes based on the simulation parameters, and multiplying the determined gain factors with transfer functions of corresponding nodes.

Aspect 6, a simulation method for simulating a cascade communication system that comprises a plurality of nodes numbered as 1 to N successively from a transmitter to a receiver, and N is greater than or equal to 1, wherein, the method includes: acquiring simulation parameters required for simulating the cascade communication system; calculating reverse transfer functions of the respective nodes; determining a current node in a sequence from the Nth node to the first node; adding noise that should be added at the current node to a simulation signal of a previous node from the current node; simulating the current node to generate a simulation signal of the current node, by using the simulation signal of the previous node added with the noise that should be added at the current node, based on the reverse transfer function of the current node; judging whether simulations of all the nodes are completed; if judged that the simulations of all the nodes are not completed, repeating the adding and the simulating for the simulation signal of the current node; if judged that the simulations of all the nodes are completed, determining a cost of the cascade communication system based on the simulation signal of the current node.

Aspect 7, the simulation method according to aspect 6, wherein, the adding adds noise indicated by power or vector, and the simulating simulates the current node by multiplying the simulation signal of the previous node added with the noise that should be added at the current node with reverse transfer function of the current node.

Aspect 8, the simulation method according to aspect 6, wherein, the simulation method further comprises generating noise in a form of random number time series, the adding adds the noise in the form of random number time series; the simulating comprises determining a filter coefficient based on the reverse transfer function of the current node, and filtering the simulation signal of the previous node added with the noise that should be added at the current node, based on the determined filter coefficient.

Aspect 9, the simulation method according to aspect 8, wherein, the cost of the cascade communication system is determined by determining the power of the simulation signal of the current node.

Aspect 10, the simulation method according to aspect 6, wherein, the simulation method simulates a system cost caused by PDL of the cascade communication system, the calculating calculates reverse transfer functions of respective nodes by determining gain factors of the respective nodes based on the simulation parameters, and multiplying the determined gain factors with transfer functions of corresponding nodes.

As compared with the simulation device using the conventional method, the simulation device in the embodiment of the present invention greatly improves the simulation efficiency and reduces the simulation time under the substantially same accuracy. With respect to simulation devices of improved algorithms provided by others, the simulation device in the embodiment of the invention has a higher accuracy.

In reference to the following descriptions and drawings, these and further aspects, embodiments and features will be clearer. The descriptions and drawings concretely disclose the specific embodiments of the present invention, and specify the principle of the invention and the ways that can be adopted. It shall be understood that the scopes of the embodiments of the present invention are not limited thereby. Within the range of the spirit and provisions of the accompanied claims, the embodiments of the present invention include various changes, modifications and equivalents.

Features described and/or illustrated with respect to one embodiment can be used in one or more other embodiments in the same or similar way, by combining features in other embodiments or replacing features in other embodiments.

To be emphasized, the term "include/comprise" or "including/comprising" in the text means the existence of feature, component, integral or component, but not excluding the existence or addition of one or more other features, integrals, steps or components.

BRIEF DESCRIPTION OF THE DRAWINGS

FIG. 1 schematically illustrates a principle diagram of a conventional simulation method for cascade communication system.

FIG. 2 schematically illustrates a principle diagram of a simulation method for cascade communication system according to an embodiment of the present invention.

DETAILED DESCRIPTION OF THE EMBODIMENTS

Figure 3:
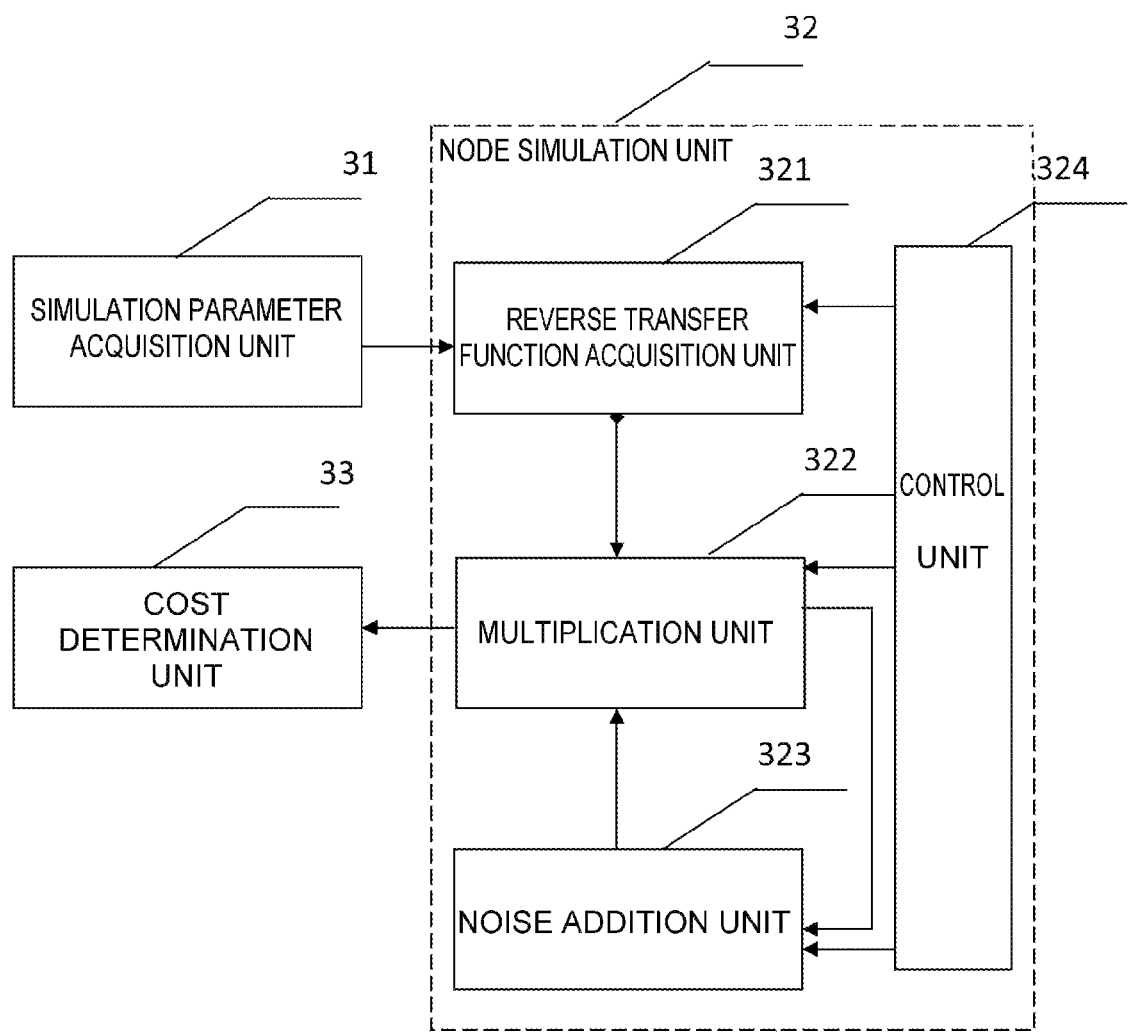
FIG. 3 illustrates a schematic block diagram of a simulation device according to an embodiment of the present invention.

During the research of the invention, the inventor studies the introduction and recovery of noise and signal in the communication system. A transmission signal $s_0$ transmitted by the transmitter and a noise $n_0$ introduced by the optical amplifier both can be represented in 2×1 vectors, i.e., $$s_0 = \begin{bmatrix} s_h \\ s_v \end{bmatrix}$$

and $$n_0 = \begin{bmatrix} n_h \\ n_v \end{bmatrix};$$

h and v are two polarization states orthogonal to each other; and each component of the vector is a complex number. After being transmitted through N number of nodes, the signal $s_R$ and the noise $n_R$ before the receiver are shown in Equations 1) and 2), wherein $H_i$ is the transfer function of the $i^{th}$ node, and $n_i$ is the noise introduced at the $i^{th}$ node.

$$s_R = H_N \ldots H_2 H_1 s_0 \quad 1)$$

$$n_R = H_N \ldots H_2 H_1 n_0 + H_N \ldots H_2 n_1 + 'H_N \ldots H_3 n_2 + \ldots + H_N n_{N-1} + n_N \quad 2)$$

In the receiver, the response of the equalizer is the reverse function of the channel transfer function, so the equalized signals $s_E$ and $n_E$ are given in Equations 3) and 4) respectively.

$$s_E = (H_N \ldots H_2 H_1)^{-1} H_N \ldots H_2 H_1 s_0 = s_0 \quad 3)$$

$$n_E = (H_N \ldots H_2 H_1)^{-1} \begin{bmatrix} H_N \ldots H_2 H_1 n_0 + H_N \ldots H_2 n_1 + \\ H_N \ldots H_3 n_2 + \ldots + H_N n_{N-1} + n_N \end{bmatrix} \quad 4)$$

$$= n_0 + H_1^{-1} n_1 + H_1^{-1} H_2^{-1} n_2 + \ldots +$$

$$H_1^{-1} H_2^{-1} \ldots H_N^{-1} n_0$$

It can be seen that the signal can be completely recovered whether under an ideal condition or a non-ideal condition. But the situation of the noise is different. When the system has no damage (ideal condition), the transfer function H=1, and then the equalized noise is the sum of powers of noises introduced by all the nodes. While under the non-ideal condition, as shown in Equation 4), the equalized noise is stronger than that under the ideal condition. Thus the inventor considers that when a system simulation is carried out, only the noise shall be considered, and the signal need not to be considered. The embodiments of the present invention are designed based on this technical idea.

The embodiments of the present invention are described in details as follows in reference to the drawings.

FIG. 2 schematically illustrates a principle diagram of a simulation method for cascade communication system according to an embodiment of the present invention.

As shown in FIG. 2, in the simulation method according to an embodiment of the present invention, a simulation is carried out in a reverse order of the nodes in the communication link to be simulated. That is, for the following communication system to be simulated, transmitter->optical node 1 (205)-> . . . ->optical node N-3 (204)->optical node N-2 (203)->optical node N-1 (202)->optical node N (201)->receiver, the optical node N (201) is simulated firstly, then the optical node N-1 (202) is simulated, . . . , and finally the optical node 1 (205) is simulated. After all the optical nodes are simulated, the noise (noise power) is calculated by a calculation module 206.

In addition, when each of the optical nodes is simulated, a noise 111 is firstly simulated, then a transmission node 207 is simulated, and finally a transmission optical fiber 208 is simulated. This order is different from the simulation order of the nodes in FIG. 1. In the embodiment of the present invention, the transmission characteristics of a transmission optical fiber 107 and a transmission node 108 are combined and represented by a reverse transfer function $H^{-1}$, including various mechanisms damaging the system performance.

In details, according to an embodiment of the present invention, the noise 111 is firstly added at the respective nodes, i.e., the noise 111 is added to a noise signal transmitted from a previous optical node having been simulated, and then the noise signal added with the noise is multiplied by the reverse transfer function $H^{-1}$.

Thus, in the whole simulation process, only noise characteristics shall be considered, a long signal sequence need not to be generated, and the long signal sequence also need not to be processed during the simulations of each of the nodes, so that the simulation efficiency can be improved. In addition, the transmitter also need not to be simulated. Furthermore, since a reverse operation of the transfer function of the whole link is avoided, the processing of the calculation module 206 is much simpler than the simulation of the receiver, thus the simulation efficiency is further improved.

The calculation module 206 is described as follows.

The calculation module 206 is used, for example, to acquire a performance cost $Q^{penalty}$ of the system. Equation 5) is an equation for calculating the performance cost $Q^{penalty}$, wherein $SNR^0$ is a SNR of the system when there is no damage, $SNR^{Cal}$ is a SNR of the system when there occurs damage, $S_0$ is an original power of the signal (the transmitting power of the transmitter which is a predetermined simulation parameter, can be used for calculating the SNR), $n_i$ is the noise power at the $i^{th}$ node, and $n_{Cal}$ is the noise power calculated by the calculation module 206.

$$Q^{Penalty} = \quad 5)$$

$$SNR^0 - SNR^{Cal} = 10\log_{10}\left(\frac{S_0}{\sum n_i}\right) - 10\log_{10}\left(\frac{S_0}{n_{Cal}}\right) = 10\log_{10}\left(\frac{n_{Cal}}{\sum n_i}\right)$$

FIG. 3 illustrates a schematic block diagram of a simulation device according to an embodiment of the present invention. As shown in FIG. 3, the simulation device according to an embodiment of the present invention comprises a simulation parameter acquisition unit 31, a node simulation unit 32, and a cost determination unit 33, wherein the node simulation unit 32 comprises a reverse transfer function acquisition unit 321, a multiplication unit 322, a noise addition unit 323, and a control unit 324. The control unit 324 determines the currently simulated nodes in a reverse order, and coordinates the operations of the reverse transfer function acquisition unit 321, the multiplication unit 322 and the noise addition unit 323. The control unit 324 can be corresponding to the current node determination unit in the embodiment of the present invention.

The simulation parameter acquisition unit 31, for example, comprises an input unit that receives simulation parameters inputted by the user. The input unit may comprise display, keyboard, mouse, etc, and the user inputs simulation parameters through the input unit. In addition, the simulation parameter acquisition unit 31, for example, is a read unit that reads simulation parameters related to the communication system to be simulated, stored locally or remotely. The simulation parameter acquisition unit 31 may also be a reception unit that receives simulation parameters from the server through a wired or wireless transmission. These parameters include parameters for calculating the reverse transfer function or transfer function, e.g., parameters reflecting transmission characteristics of respective transmission nodes in the communication system to be simulated and transmission optical fiber segments related to the transmission nodes, e.g., dispersion value and PDL value. The simulation parameters also include parameters indicating noise that should be added at the transmission nodes. In addition, the simulation parameters can also include the signal original power (output power of the transmitter).

In the embodiment of the present invention, the transmission nodes and related transmission optical fiber segments are generally called as nodes, and also called as optical nodes since the embodiment of the present invention is described with the optical communication system. To be noted, the embodiment of the present invention can also be applied to other communication systems.

The control unit 324 determines the currently simulated nodes in a reverse order (from the Nth optical node to the first optical node).

The reverse transfer function acquisition unit 321 calculates reverse transfer functions $H^{-1}$ (reverse function of the transfer functions H) of the respective optical nodes, according to the inputted simulation parameters (e.g., dispersion values and PDL values) of the respective optical nodes. In the embodiment of the present invention, under the control of the control unit 324, firstly calculating a reverse transfer function $H_N^{-1}$ of the Nth optical node in the communication system to be simulated that comprises optical nodes numbered as 1 to N successively from the transmitter to the receiver. The calculations are successively carried out in the reverse order, until the reverse transfer function $H_1^{-1}$ of the $1^{st}$ optical node is calculated. In addition, the reverse transfer functions of the respective optical nodes can also be calculated in any other order; under the control of the control unit 324, a reverse transfer function corresponding to the current optical node determined by the control unit 324 is transmitted to the multiplication unit.

The noise addition unit 323 adds noise that should be added at the current optical node. When the simulated system and the effect in the system are scalars (e.g., under the condition that the simulated system is a system only having one polarization state or insensitive to the polarization state), only noise power need to be considered. But when the simulated system and the effect in the system are vectors (e.g., under the condition that the simulated system is a polarization multiplexing system), the noise need to be described with the corresponding vector.

The multiplication unit 322 multiplies the signal from the noise addition unit 323 with the corresponding reverse transfer function acquired by the reverse transfer function acquisition unit 321, and under the control of the control unit 324, transmits the multiplication result (simulation signal of the current node) to the noise addition unit 323 when one or more optical nodes are still not processed, and outputs the multiplication result (simulation signal) to the cost determination unit 33, when all of the optical nodes are processed.

The reverse transfer function acquisition unit 321 can acquire a reverse transfer function as follows. When the link effect is a scalar, the reverse transfer function is the reciprocal of the transfer function; and when the link effect is a vector, the transfer function is a matrix, and the reverse transfer function is a reciprocal matrix thereof.

In addition, when a system cost caused by PDL is evaluated, the respective optical nodes can be deemed as the PDL vector unit and the (noise) amplifier which are serial connected. The reverse transfer function acquisition unit 321 can acquire a reverse transfer function by multiplying the transmission matrix with a fixed coefficient. The details are described as follows.

The PDL vector unit is equivalent to a cascade of two random polarization rotation units and a PDL unit in fixed direction, wherein the PDL unit in fixed direction is disposed between the two random polarization rotation units. The direction of the PDL vector depends on the direction of polarization rotation, and the magnitude of the PDL vector depends on the PDL unit in fixed direction. Transmission matrixes U and V are corresponding to the two random polarization rotation units, respectively. A transmission matrix $$\Gamma = \begin{bmatrix} \sqrt{1-\gamma} & 0 \\ 0 & \sqrt{1+\gamma} \end{bmatrix}$$

is corresponding to the PDL unit in fixed direction, the total loss is 0, γ can be acquired based on DB value of the PDL vector (the DB value of the PDL vector can be represented as $$10\log 10\left(\frac{1+\gamma}{1-\gamma}\right));$$

it shall be noted that, the DB value of the PDL vector for each of the optical nodes is acquired by the simulation parameter acquisition unit 31 as simulation parameters, and it corresponds to the previous parameters reflecting transmission characteristics of respective transmission nodes in the communication system to be simulated and transmission optical fiber segments related to the transmission nodes, e.g., dispersion value and PDL value. The transfer function H of the optical node is a product of U, Γ and V, as shown in Equation 6).

$$H=U\Gamma V \qquad 6)$$

According to the reverse transmission method, $H^{-1}$ shall be obtained at first, as shown in Equation 7).

$$H^{-1}=V^{-1}\Gamma^{-1}U^{-1} \qquad 7)$$

To be noted, the reciprocal matrix of the random rotation matrix is still a random rotation matrix, while the reciprocal matrix $$\Gamma^{-1} = \frac{1}{\sqrt{1-\gamma_i^2}} \begin{bmatrix} \sqrt{1+\gamma_i} & 0 \\ 0 & \sqrt{1-\gamma_i} \end{bmatrix}$$

of the PDL unit in fixed direction is equivalent to introducing a gain factor $$\frac{1}{\sqrt{1-\gamma_i^2}}$$

based on the transmission matrix, and at the same time, interchange the two polarization directions. In consideration of the existence of the random rotation matrix, the operation of interchanging the two polarization directions can be absorbed in the random rotation matrix. Thus the reciprocal matrix of the optical node can be statistically deemed as a result of multiplying the optical node transfer function per se with corresponding gain factor $$\frac{1}{\sqrt{1-\gamma_i^2}}.$$

Since PDL is random, the system cost caused thereby is also random, thus the system cost caused by PDL shall also be evaluated in a statistical range, e.g., the system cost is under a specific truncation probability. In order to obtain the system cost of a statistical sense, only the statistic characteristics of PDL need to be kept constant. Thus the method herein for processing the reciprocal matrix of the optical node is feasible.

That is to say, when the simulation system is used to evaluate a system cost caused by PDL of the communication system, a coefficient $$\frac{1}{\sqrt{1-\gamma_i^2}}$$

can be calculated according to the noise requirement for the optical node, and then the coefficient is multiplied by the transfer function of the optical node. Although what is calculates is a reverse transfer function, it avoids a direct inversion of the transfer function, so as to improve the calculation speed, and decrease the calculation load of the reverse transfer function acquisition unit 321.

When the system cost caused by PDL is calculated, parameters inputted to the module 31 comprise: dB values of respective optical node PDL, noise power of the optical nodes, and output power of the transmitter.

The cost determination unit 33 calculates the system cost by using the noise signal from the multiplication unit 322 based on Equation 5).

When the system cost caused by PDL is evaluated, the cost determination unit 33 acquires power $n_{h/v}$ of the noise on two polarization components, and calculates the system cost based on Equation 8).

$$Q_{h/v}^{penalty} = SNR_{h/v}^{cal} - SNR_{h/v}^{0} = 10 * \log 10 \left( \frac{\sum_i n_i/2}{n_{h/v}} \right) \quad 8)$$

Wherein $SNR_{h/v}^{cal}$ is a SNR determined based on the noise signal received from the multiplication unit, and its calculation is for example shown in Equation 9), in which $S_0$ is signal power. The $SNR_{h/v}^0$ of a system having no PDL can be obtained based on Equation 10), in which $n_i$ is the noise power at the $i^{th}$ node. The decrease of SNR is the degradation of the system performance.

$$SNR_{h/v}^{cal} = 10 * \log 10 \left( \frac{S_0/2}{n_{h/v}} \right) \quad 9)$$

$$SNR_{h/v}^0 = 10 * \log 10 \left( \frac{S_0}{\sum_i n_i} \right) \quad 10)$$

Equation 5) calculates system costs caused by all factors (including dispersion, polarization film dispersion, PDL); Equation 10) calculates system cost caused by PDL.

The multiplication unit in FIG. 3 is corresponding to the current node simulation unit in the embodiment of the present invention.

As compared with the simulation device using the conventional method, the simulation device in the embodiment of the present invention greatly improves the simulation efficiency and reduces the simulation time under the substantially same accuracy. With respect to simulation devices of improved algorithms provided by others, the simulation device in the embodiment of the invention has a higher accuracy.

Figure 4:
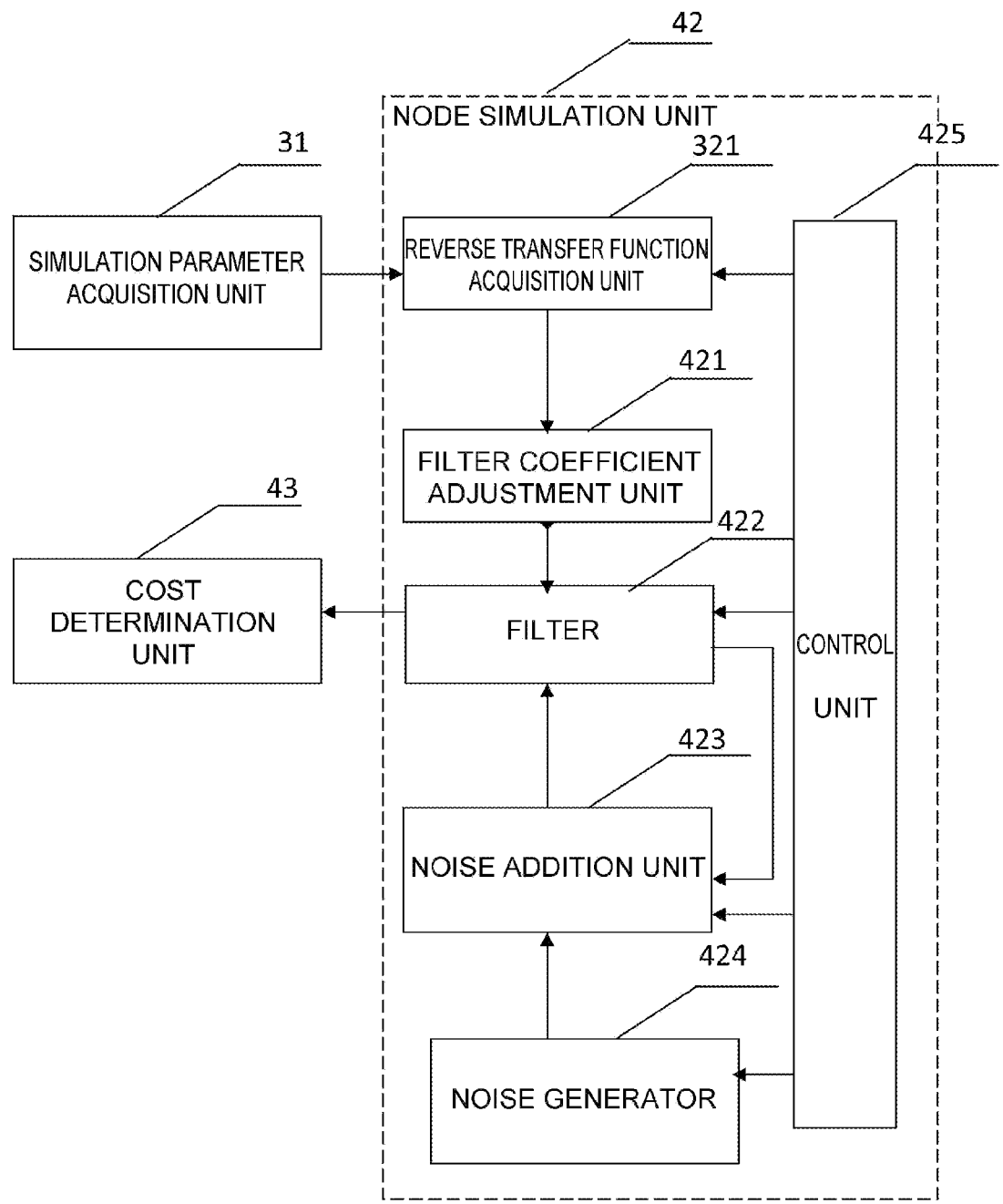
FIG. 4 illustrates a schematic block diagram of a simulation device according to another embodiment of the present invention.

FIG. 4 illustrates a schematic block diagram of a simulation device according to another embodiment of the present invention. As shown in FIG. 4, the simulation device according to an embodiment of the present invention comprises a simulation parameter acquisition unit 31, a node simulation unit 42, and a cost determination unit 43, wherein the node simulation unit 42 comprises a reverse transfer function acquisition unit 321, a filter coefficient adjustment unit 421, a filter 422, a noise addition unit 423, a noise generation device 424, and a control unit 425.

The control unit 425 determines the currently simulated nodes in a reverse order (from the Nth optical node to the 1$^{st}$ optical node), coordinates and controls operations of the reverse transfer function acquisition unit 321, the filter coefficient adjustment unit 421, the filter 422, the noise addition unit 423 and the noise generation device 424.

As described previously, the reverse transfer function acquisition unit 321 determines a reverse function of the transfer function of the current node, i.e., the reverse transfer function, based on the inputted simulation parameter. The filter coefficient adjustment unit 421 determines a filter coefficient based on the reverse transfer function of the current node, e.g., the filter coefficient can be directly obtained through an inverse Fourier transform of the reverse transfer function. Under the control of the control unit 425, the noise addition unit 423 adds noise that should be added at the current optical node (predetermined noise).

The filter 422 filters the signal added with the noise, based on the filter coefficient determined by the filter coefficient adjustment unit 421, and under the control of the control unit 425, transmits the filtered signal to the noise addition unit 423 for a simulation of the next node, when one or more optical nodes are still not processed, and outputs the filtering result to the cost determination unit 43 when all optical nodes are processed.

The noise generation device 424 generates simulation noise (random number time series) based on the noise power that should be added, the simulation noise is sent to the noise addition unit 423, at which it is added to the noise signal (i.e., the output of the filter) from the previous node. The noise addition unit 423 transmits the noise signal added with noise to the filter 422. Since the noise signal is the time domain series, the noise addition is an addition operation at the corresponding time point.

The cost determination unit 43 calculates a variance of the output of the filter. The cost determination unit 43 can be a power calculation unit. The power is the variance $\text{Sum}((s(t)-s0)^2)$ of the outputted time domain noise signal, wherein $s(t)$ is a time domain signal, and $s0$ is an average. When the variance is calculated, the system cost can be calculated based on Equation 5) or 8).

The filter coefficient adjustment unit 421 and the filter 422 are corresponding to the current node simulation unit in the embodiment of the present invention.

Like the device previously described in combination with FIG. 3, as compared with the simulation device using the conventional method, the simulation device in the embodiment of the present invention greatly improves the simulation efficiency and reduces the simulation time under the substantially same accuracy. With respect to simulation devices of improved algorithms provided by others, the simulation device in the embodiment of the invention has a higher accuracy.

Figure 5:
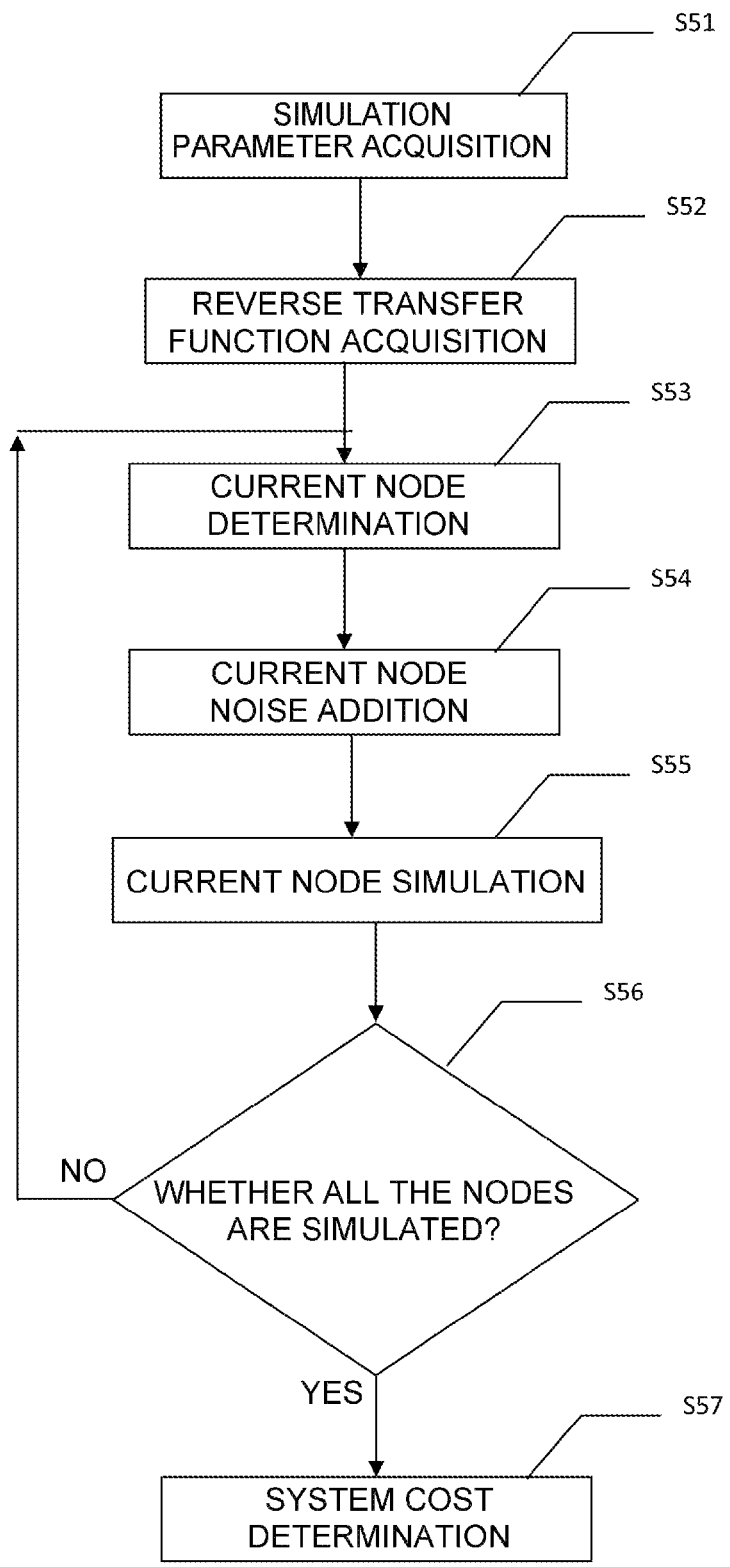
FIG. 5 illustrates a flow diagram of a simulation method for cascade communication system according to an embodiment of the present invention.

FIG. 5 illustrates a flow diagram of a simulation method for cascade communication system according to an embodiment of the present invention. As shown in FIG. 5, firstly the simulation parameters are acquired in step S51, such as noise of the PDL unit of each optical node, dispersion, noise that should be added, and transmission power of the transmitter; then in step S52, the reverse transfer function is determined based on the simulation parameters acquired in step S51; next, in step S53, the control unit (current node determination unit) determines the current node based on a reverse order; and the current noise is added in step S54, wherein the noise power or noise indicated by vector can be added directly. In another embodiment, noise in form of random number time series can be added. In such case, the random number time series is firstly generated based on the noise power to be added. Then the simulation of the current node is carried out in step S55. In an embodiment, the multiplication unit multiplies the reverse transfer function of the current node with a noise signal of the previous node added with the noise of the current node, so as to simulate the current node. In case where the added noise is in form of random number time series, the filter coefficient is adjusted based on the reverse transfer function, then the filter having the adjusted coefficient filters the noise signal of the previous node added with the noise of the current node.

Next, it is judged in step S56 whether all the nodes are simulated. If all the nodes are simulated (step S56, Yes), the system cost is determined in step S57. If not all the nodes are simulated (step S56, No), returning to step S53 to determine another current node, and repeating steps S53 to S57.

As compared with the conventional method, the simulation method in the embodiment of the present invention greatly improves the simulation efficiency and reduces the simulation time under the substantially same accuracy. With respect to improved algorithms provided by others, the simulation method in the embodiment of the invention has a higher accuracy.

The above device and method of the present invention can be implemented by hardware, or the combination of hardware and software. The present invention relates to such a computer readable program that enables a logic unit to implement the previously described devices, components, methods or steps, when the program is executed by the logic unit. The present invention also relates to storage medium for storing the above program, e.g., hard disk, magnetic disk, optical disk, DVD and flash memory.

The present invention is described in combination with the above embodiments. But a person skilled in the art shall understand that the descriptions are just exemplary, and has no intent to limit the protection scope of the present invention. A person skilled in the art can make various modifications and changes to the present invention based on spirit and principle of the present invention, and those modifications and changes are also within the scope of the present invention.

What is claimed is:

1. A simulation device for simulating a cascade communication system that comprises a plurality of nodes numbered as 1 to N successively from a transmitter to a receiver, and N is greater than or equal to 1, wherein, the device comprises a processor and a memory comprising a simulation parameter acquisition unit, a reverse transfer function acquisition unit, a current node determination unit, a noise addition unit, a current node simulation unit, a control unit, and a cost determination unit, the simulation parameter acquisition unit acquires simulation parameters required for simulating the cascade communication system;

the reverse transfer function acquisition unit calculates reverse transfer functions of the respective nodes based on the simulation parameters;

the current node determination unit determines a current node in a sequence from the Nth node to the first node;

the noise addition unit adds noise that should be added at the current node to a simulation signal of a previous node from the current node;

the current node simulation unit simulates the current node to generate a simulation signal of the current node, by using the simulation signal of the previous node added with the noise that should be added at the current node, based on the reverse transfer function of the current node;

the control unit judges whether simulations of all the nodes are completed, and controls to make the simulation signal of the current node simulation unit be output to the noise addition unit if the simulations of all the nodes are not completed, or controls to make the simulation signal of the current node be output to the cost determination unit if the simulations of all the nodes are completed; and the cost determination unit determines the cost of the cascade communication system based on the simulation signal from the current node simulation unit, wherein, the simulation signal of Nth node is obtained by multiplying a noise that should be added at the Nth node with reverse transfer function of the Nth node.

2. The simulation device according to claim 1, wherein, the noise addition unit adds noise indicated by power or vector, and the current node simulation unit simulates the current node by multiplying the simulation signal of the previous node added with the noise that should be added at the current node with the reverse transfer function of the current node.

3. The simulation device according to claim 1, wherein, the simulation device further comprises a noise generation device for generating noise in a form of random number time series, the noise addition unit adds the noise in the form of random number time series to the simulation signal of the previous node, the current node simulation unit comprises a filter coefficient adjustment unit and a filter, the filter coefficient adjustment unit determines a filter coefficient to be used by the filter based on the reverse transfer function of the current node, and the filter filters the simulation signal of the previous node added with the noise that should be added at the current node, based on the filter coefficient determined by the filter coefficient adjustment unit.

4. The simulation device according to claim 3, wherein, the cost determination unit determines the cost of the cascade communication system by determining the power of the simulation signal from the current node simulation unit.

5. The simulation device according to claim 1, wherein, the simulation device simulates a system cost caused by polarization dependent losses of the cascade communication system, and the reverse transfer function acquisition unit calculates reverse transfer functions of the respective nodes by determining gain factors of the respective nodes based on the simulation parameters, and multiplying the determined gain factors with transfer functions of corresponding nodes.

6. A simulation method for simulating a cascade communication system that comprises a plurality of nodes numbered as 1 to N successively from a transmitter to a receiver, and N is greater than or equal to 1, wherein, the method comprises:
acquiring simulation parameters required for simulating the cascade communication system;
calculating reverse transfer functions of the respective nodes;
determining a current node in a sequence from the Nth node to the first node;
adding noise that should be added at the current node to a simulation signal of a previous node from the current node;
simulating the current node to generate a simulation signal of the current node, by using the simulation signal of the previous node added with the noise that should be added at the current node, based on the reverse transfer function of the current node;
judging whether simulations of all the nodes are completed;
if the simulations of all the nodes are not completed, repeating the adding and the simulating for the simulation signal of the current node; if the simulations of all the nodes are completed, determining a cost of the cascade communication system based on the simulation signal of the current node,
wherein, the simulation signal of Nth node is obtained by multiplying a noise that should be added at the Nth node with reverse transfer function of the Nth node.

7. The simulation method according to claim 6, wherein, the adding adds noise indicated by power or vector, and the simulating simulates the current node by multiplying the simulation signal of the previous node added with the noise that should be added at the current node with the reverse transfer function of the current node.

8. The simulation method according to claim 6, wherein, the simulation method further comprises generating noise in a form of random number time series,
the adding adds the noise in the form of random number time series;
the simulating comprises determining a filter coefficient based on the reverse transfer function of the current node, and filtering the simulation signal of the previous node added with the noise that should be added at the current node, based on the determined filter coefficient.

9. The simulation method according to claim 8, wherein, the cost of the cascade communication system is determined by determining the power of the simulation signal of the current node.

10. The simulation method according to claim 6, wherein, the simulation method simulates a system cost caused by polarization dependent losses of the cascade communication system, and the calculating calculates reverse transfer functions of the respective nodes by determining gain factors of the respective nodes based on the simulation parameters, and multiplying the determined gain factors with transfer functions of corresponding nodes.

11. A non-transitory computer readable medium for simulating a cascade communication system that comprises a plurality of nodes numbered as 1 to N successively from a transmitter to a receiver, and N is greater than or equal to 1, wherein, the device comprises a processor and a memory comprising a simulation parameter acquisition unit, a reverse transfer function acquisition unit, a current node determination unit, a noise addition unit, a current node simulation unit, a control unit, and a cost determination unit,
the simulation parameter acquisition unit acquires simulation parameters required for simulating the cascade communication system;
the reverse transfer function acquisition unit calculates reverse transfer functions of the respective nodes based on the simulation parameters;
the current node determination unit determines a current node in a sequence from the Nth node to the first node;
the noise addition unit adds noise that should be added at the current node to a simulation signal of a previous node from the current node;
the current node simulation unit simulates the current node to generate a simulation signal of the current node, by using the simulation signal of the previous node added with the noise that should be added at the current node, based on the reverse transfer function of the current node;
the control unit judges whether simulations of all the nodes are completed, and controls to make the simulation signal of the current node simulation unit be output to the noise addition unit if the simulations of all the nodes are not completed, or controls to make the simulation signal of the current node be output to the cost determination unit if the simulations of all the nodes are completed; and
the cost determination unit determines the cost of the cascade communication system based on the simulation signal from the current node simulation unit,
wherein, the simulation signal of Nth node is obtained by multiplying a noise that should be added at the Nth node with reverse transfer function of the Nth node.

12. The non-transitory computer readable medium according to claim 11, wherein, the noise addition unit adds noise indicated by power or vector, and the current node simulation unit simulates the current node by multiplying the simulation signal of the previous node added with the noise that should be added at the current node with the reverse transfer function of the current node.

13. The non-transitory computer readable medium according to claim 11, wherein, the simulation device further comprises a noise generation device for generating noise in a form of random number time series, the noise addition unit adds the noise in the form of random number time series to the simulation signal of the previous node, the current node simulation unit comprises a filter coefficient adjustment unit and a filter, the filter coefficient adjustment unit determines a filter coefficient to be used by the filter based on the reverse transfer function of the current node, and the filter filters the simulation signal of the previous node added with the noise that should be added at the current node, based on the filter coefficient determined by the filter coefficient adjustment unit.

14. The non-transitory computer readable medium according to claim 13, wherein, the cost determination unit determines the cost of the cascade communication system by determining the power of the simulation signal from the current node simulation unit.

15. The non-transitory computer readable medium according to claim 11, wherein, the simulation device simulates a system cost caused by polarization dependent losses of the cascade communication system, and the reverse transfer function acquisition unit calculates reverse transfer functions of the respective nodes by determining gain factors of the respective nodes based on the simulation parameters, and multiplying the determined gain factors with transfer functions of corresponding nodes.

* * * * *